United States Patent

[11] 3,612,695

[72] Inventors Gijsbertus Bouwhuis
Emmasingel, Eindhoven;
Hendrik de Lang, Delft, both of
Netherlands
[21] Appl. No. 860,208
[22] Filed Sept. 23, 1969
[45] Patented Oct. 12, 1971
[73] Assignee U. S. Philips Corporation
New York, N.Y.
[32] Priority Sept. 26, 1968
[33] Netherlands
[31] 68/3749

[54] ARRANGEMENT FOR MEASURING THE ROTATION OF A FIRST OBJECT RELATIVE TO A SECOND OBJECT
9 Claims, 6 Drawing Figs.
[52] U.S. Cl............................................. 356/114,
250/225, 250/237, 356/139, 356/150, 356/151,
356/170
[51] Int. Cl........................................... G01b 11/00
[50] Field of Search.................................. 356/150,
139, 151, 169, 170, 114; 250/237 G, 225, 237

[56] References Cited
UNITED STATES PATENTS
| 3,198,061 | 8/1965 | Hock................. | 250/237 (G) |
| 3,244,895 | 4/1966 | Anderegg, Jr. ..... | 356/170 |
| 3,421,011 | 1/1969 | Hock................. | 250/231 |
| 3,482,107 | 12/1969 | Hock................. | 356/169 |
| 3,496,346 | 2/1970 | Foskett et al. ..... | 356/169 |
| 3,508,834 | 4/1970 | Hock et al. ........ | 356/169 |

FOREIGN PATENTS
| 398,097 | 1966 | Switzerland................. | 356/169 |
| 991,710 | 1965 | Great Britain............... | 250/237 (G) |

*Primary Examiner*—Ronald L. Wibert
*Assistant Examiner*—J. Rothenberg
*Attorney*—Frank R. Trifari ABSTRACT: An arrangement for measuring the rotation of a first object relative to a second object is disclosed. Light from a source of radiation attached to the first object is directed to a first zone on a grating attached to the second object, is then directed via polarization modulators and concave mirrors to a second zone on the grating and finally impinges upon a pair of photocells. The output of the photocells is processed to determine both the magnitude and direction of the relative rotation.

INVENTORS
GIJSBERTUS BOUWHUIS
HENDRIK DE LANG

ARRANGEMENT FOR MEASURING THE ROTATION OF A FIRST OBJECT RELATIVE TO A SECOND OBJECT

The invention relates to an arrangement for measuring the rotation of a first object relative to a second object, in which the first object is rigidly secured to a grating the lines of which are substantially at right angles to the direction of rotation, a source of radiation and an optical system being so connected to the second object that an image of a first zone of the grating is formed on a second zone of the grating, which image moves in opposite sense to the second zone during the movement of the grating, the radiation being finally directed on to at least two photoelectric elements, the photocurrents being periodic functions of the rotation, and the magnitude of the rotation being derived from the phases of the periodic photocurrents.

Such an arrangement is known from British Pat. specification No. 991,710. In the known arrangement the optical system comprises a large number of elements such as plane mirrors and lenses. The known optical system has the disadvantage that the requirements in respect of the tolerated aberrations can only be satisfied with difficulty. It is an object of the invention to obviate this disadvantage and to provide an optical system by means of which a satisfactory imaging quality over a large field of view is obtained by simple means. For this purpose, the invention is characterized in that between the first and second zones a polarization-separating plane mirror and two concave mirrors are inserted in each of the paths of the beams of radiation of the orders +1 and −1, and that further in each of said paths an $n\lambda/4$ plate ($n=odd$) is inserted with diagonal orientation between the plane mirror and each of the concave mirrors so that the beams of radiation reflected at the concave mirrors are circularly polarized in planes at right angles or substantially at right angles to one another.

A compact form of the arrangement in which, in addition, the axis of rotation of the object neither lies in the path of the radiation nor coincides partly with part of the optical system, is obtained by inserting a system of plane mirrors into each of the ray-paths in the immediate proximity of the first and second zones, each system comprising a first mirror which is inclined at an angle of 45° or substantially 45° to the plane of the grating and a second mirror arranged at right angles or substantially at right angles to the plane of the grating, the line of intersection of the second mirror and the plane of the grating being at an acute angle to the grating lines. This enables the apparatus to be arranged about any cross section of the rotation shaft.

An advantageous embodiment of an arrangement largely devoid of aberrations is obtained by arranging a planoconvex lens in the immediate proximity of each of the zones, the convex surfaces of these lenses having the same or substantially the same centers of curvature as the respective concave mirrors the radii of curvature of which are equal or substantially equal to the optical distance between the first and second zones and the respective concave mirrors, the said centers of curvature lying on the grating diametrically with respect to the axis of rotation. It should be noted that from the "Journal of the Optical Society of America," July 1959, page 713, it is known to obtain a largely aberration-free 1 : 1 image of an object lying close to the plane surface of a planoconvex lens if the centers of curvature of the convex surface of the lens and of a concave mirror coincide at least substantially.

Further it is of advantage to provide a central aperture in the polarization-separating plane mirror. Thus, the natural light of the light source can be directed through this aperture on to the grating, which in this case is a reflection grating. The subbeams of the orders +1 and −1 reflected at the first zone of the grating are split at the plane mirror into components polarized at right angles to one another. One component is reflected, the other is transmitted. After passing through an $n\lambda/4$ plate and being reflected at a concave mirror each component again impinges on the plane mirror. Now the latter component is reflected and the former is transmitted. They are both reflected at the second zone of the grating. The reflected directionally coincident subbeams of the orders (+1, +1 ) and (−1, −1 ) polarized at right angles to one another pass through the central aperture of the mirror and emerge from the system through an aperture in one of the concave mirrors. Thus, by comparatively simple means a compact rotation-measuring system is obtained in which directional detection can readily be performed.

In order to enable an alternating-voltage signal at a comparatively high frequency to be derived from the detector system when the grating is stationary, in each of the subbeams of different orders of diffraction an electro-optical crystal is inserted, these crystals having principal directions which are at right angles to one another and having identical alternating voltages applied to them.

The invention will now be described more fully with reference to the accompanying drawings, in which.

Figure 1:
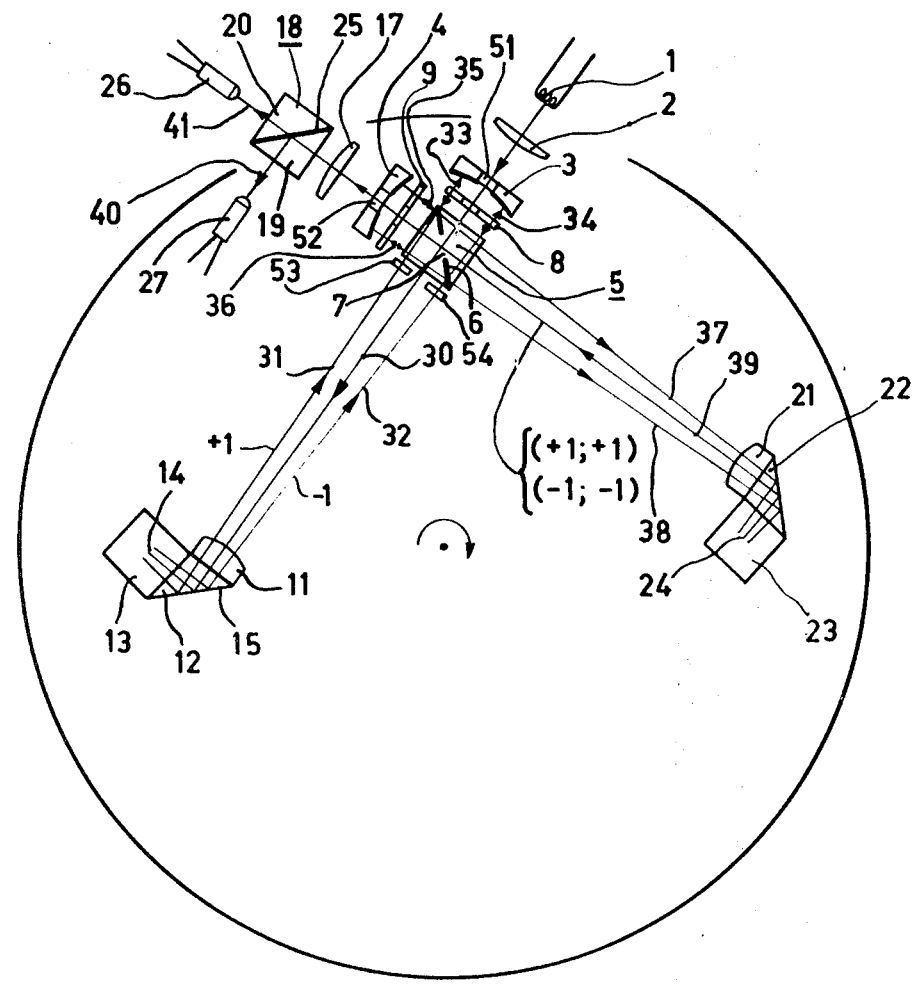
FIG. 1 shows a first embodiment of an arrangement according to the invention.
Figure 2A:
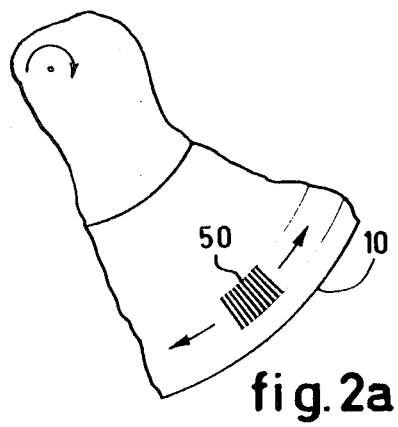
FIGS. 2a and 2b show details of the arrangement of FIG. 1.
Figure 2B:
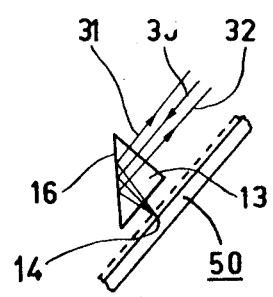

In the arrangement shown in FIG. 1, the natural light from a light source 1 is imaged in a gap 51 of a concave mirror 3 by a condenser lens 2. Hence this gap may be regarded as a light source from which a divergent light beam emerges. This light beam falls on a beam-splitting prism 5 which comprises two parts cemented together along an interface 6. The interface 6 is silvered with the exception of its center 7 and a surrounding zone. The beam, which for simplicity is shown as a single ray 30, passes unhampered through the central aperture 7 and impinges on an optical system arranged close to a grating 50 provided on a disc 10. This optical system comprises a planoconvex lens 11, a prism 12 and a prism 13 which the beam traverses in this order. The parts of the system are cemented together in a manner such that the plane surface of the planoconvex lens 11 is cemented to one of the two smaller rectangular faces of an isosceles prism 12, the other of these faces of the prism 12 being cemented to one of the two faces of an isosceles right-angled prism 13 opposite to a 45° angle. The plane of the hypotenuse face of the prism 12 is at right angles to the plane of the grating 50. The line of intersection of the hypotenuse-face plane and the plane of the grating is inclined at an acute angle to the grating lines, a few of which are shown in Flg. 2a.

The grating 50 is a reflection phase grating. It may, for example, comprise a glass substrate on which a periodic line structure made of aluminum has been provided. The height of the line structure varies with a period $p$. The difference in height between adjacent lines is such that the phase difference between rays reflected at adjacent lines is $\pi$ or substantially $\pi$ radians. A divergent beam 30 of radiation the path of which is parallel to the plane of the grating and which is incident on the convex surface of the lens 11, after being totally reflected first at the hypotenuse face 15 of the prism 12 and then at the hypotenuse face 16 of the prism 13 falls on the grating 50.

The divergent beam 30 is so refracted at the convex surface of the lens 11 that the beam incident on the grating 50 can be regarded as collimated. The collimated beam is reflected at a point 14 of the grating 50. The reflected coherent subbeams of the orders +1 and −1 may be written: : A sin ($\omega t - 2\pi x/p$) and A sin ($\omega t + 2\pi x/p$) where $\omega$ is the angular frequency of the radiation, $p$ the period and $x$ the linear displacement of the grating.

In the path of the subbeams, of which for simplicity only the ray 31 of the order +1 and the ray 32 of the order −1 are shown, there are inserted electro-optical crystals 53 and 54, which may be made of, for example, potassium dihydrogen phosphate. By means of an alternating voltage source (not shown) an axial electric field of value $A_0 \sin \Omega_0 t$ is applied to the crystals 53 and 54. The alternating voltage preferably has a high frequency $f$, for example $f=1$ MHz., in which case $\Omega_0 = 2\pi \cdot 10^6$. The amplitude of the alternating voltage is made small so that the crystals are operated with a low voltage.

When the beam incident on the crystal 53 and that incident on the crystal 54 are each assumed to be divided into 2 subbeams polarized at right angles to one another, one of the subbeams suffers a delay relative to the other subbeam in this crystal, for the index of refraction for one of the subbeams, for example, for the subbeam for which the direction of polarization is parallel to the plane of the drawing, increases and that of the other subbeam decreases by an amount which is a function of the instantaneous field strength $A_o \sin \Omega_o t$. In the crystal 53 the phase delay for the subbeam the direction of polarization of which is parallel to the plane of the drawing is $\Delta\Phi_1 = \Phi \sin \Omega_o t$, and that for the subbeam the direction of polarization of which is normal to the plane of the drawing is $\Delta\Phi_2 = -\Phi \sin \Omega_o t$.

Care is taken to ensure that the principal direction of the crystal 54 is at right angles to that of the crystal 53. In the crystal 54 the phase change for the subbeam the direction of polarization of which is parallel to the plane of the drawing then is: $\Delta\Phi_3 = -\Delta\Phi_1 = -\Phi \sin\Omega_o t$, while the phase change for the sub-beam the direction of polarization of which is normal to the plane of the drawing now is: $\Delta\Phi_4 = -\Delta\Phi_2 = \Phi\sin\Omega_o t$.

The four subbeams are incident on the interface 6 of the beam-splitting prism 5. The thicknesses of the layers of alternately high and low indices of refraction provided on the interface are chosen so that if the light is incident on the interface at about the Brewster angle, the light for which the direction of vibration lies in the plane of the drawing is largely transmitted and the light for which the direction of vibration is normal to the plane of the drawing is largely reflected.

The subbeam of the order +1 reflected at the interface 6 may be written: $A_2 \sin (\omega t - 2\pi(x/p) + \Phi\sin\Omega_o t)$ and that of the order $-1$: $A_2 \sin (\omega t + 2\pi(x/p) - \Phi\sin\Omega_o t)$.

The subbeam of the order +1 transmitted by the interface 6 can be written: $A_2 \sin (\omega t - 2\pi(x/p) - \Phi\sin\Omega_o t)$ and that of the order $-1$: $A_2 \sin (\omega t + 2\pi(x/p) + \Phi\sin\Omega_o t)$.

The four subbeams, which for simplicity have each been drawn as a single ray, namely 33, 34 and 35, 36 respectively, pass through λ/4 plates 8 and 9 respectively arranged in diagonal orientation, i.e., the principal axes of the plates are at an angle of 45° to the plane of the drawing. The subbeams then are reflected at the concave mirrors 3 and 4 respectively and again traverse the λ/4 plates. Thus, they have effectively traversed a λ/2 plate in diagonal orientation, i.e., their plane of polarization has been rotated through 90°.

The subbeams reflected at the concave mirror 3 after their second traversal of the λ/4 plate are polarized in a plane normal to the plane of the drawing and hence are totally reflected at the interface 6 of tee prism 5.

The subbeams reflected at the concave mirror 4 after their second traversal of the λ/4 plate are polarized in a plane parallel to the plane of the drawing and hence are totally transmitted by the interface 6 of the prism 5.

The four subbeams reunite two by two. For simplicity, each such a reunited pair is again shown by a single ray, namely the ray 37 for the order +1 and the ray 38 for the order −1. They traverse an optical system comprising a planoconvex lens 21, a prism 22 and a prism 23. This system is congruent with the system comprising the planoconvex lens 11, the prism 15 and the prism 13. One system is rotated 90° relative to the other. The center of curvature of the convex surface of each of the planoconvex lenses 11 and 21 and that of the concave mirrors 3 and 4 are coincident at two diametrically opposite locations 14 and 24 of the grating.

The rays which have been reflected at the grating in the zone 14 and have been concentrated into two parallel beams 31 and 32 are focused on to the mirrors 3 and 4. The beams reflected at the mirrors 3 and 4 are divergent and are converted by the lens 21 into parallel beams which are reflected at the grating in the zone 24. From the subbeams reflected at the reflection grating those subbeams are selected which are directionally coincident and pass through the central aperture 7 in the silvered interface 6. These are the coherent subbeams of the orders (+1, +1) and (−1, −1).

The subbeam of the order (+1, +1) having a direction of polarization parallel to the plane of the drawing can be written: $A_4 \sin (\omega t - 2\pi(2x)/p + \Phi\sin\Omega_o t)$.

The subbeam of the order (+1, +1) having a direction of polarization normal to the plane of the drawing can be written: $A_4 \sin (\omega t - 2\pi(2x)/p - \Phi\sin\Omega_o t)$.

The subbeam of the order (−1, −1) having a direction of polarization parallel to the plane of the drawing can be written: $A_4 \sin (\omega t + 2\pi(2x)/p - \Phi\sin\Omega_o t)$.

The subbeam of the order (−1, −1) having a direction of polarization normal to the plane of the drawing can be written: $A_4 \sin (\omega t + 2\pi(2x)/p + \Phi\sin\Omega_o t)$.

Through the central aperture 52 in the concave mirror 4 and a condenser lens 17 the four subbeams fall on a polarization separating prism 18.

At an interface 25 of the prism 18 the subbeams the plane of polarization of which is parallel to the plane of the drawing are transmitted to fall on a photocell 26. The subbeams the plane of polarization of which is normal to the plane of the drawing are totally reflected to fall on a photocell 27.

For the sum of the former subbeams we have: $A_4 \sin (\omega t - 2\pi(2x)/p + \Phi\sin\Omega_o t) + A_4 \sin (\omega t + 2\pi(2x)/p - \Phi\sin\Omega_o t) = 2 A_4 \sin \omega t \cdot \cos(2\pi(2x)/p - \Phi\sin\Omega_o t)$.

For the sum of the latter subbeams we have: $A_4 \sin (\omega t - 2\pi(2x)/p - \Phi\sin\Omega_o t) + A_4 \sin (\omega t + 2\pi(2x)/p + \Phi\sin\Omega_o t) = 2A_4 \sin \omega t \cdot \cos(2\pi(2x)/p + \Phi\sin\Omega_o t)$.

The alternating-voltage part of the photosignals produced by the photocells 26 and 27 is $\cos (2\pi(4x)/p - 2\Phi\sin\Omega_o t)$ and $\cos (2\pi(4x)/p + 2\Phi\sin\Omega_o t)$, respectively.

By simple means these two signals may be given a phase difference of 90° so as to permit of directional detection. One of the concave mirrors 3 and 4 must be rotated slightly about an axis situated in the plane of the respective mirror and inclined at an angle of 45° to the plane of the drawing. With a suitable choice of the angle of rotation the image of the object (the first grating zone) formed by this mirror on the second grating zone then has been shifted 1/16 part of a grating period relative to the image formed by the other concave mirror.

The signals then can be written: $\cos (2\pi(4x)/p - 2\Phi\sin\Omega_o t)$ and $\sin (2\pi(4x)/p + 2\Phi\sin\Omega_o t)$.

The signals are filtered by means of a band-pass filter having a center frequency $\Omega_o$ and a bandwidth $2\Omega_{max}$ ($\Omega_{max}$ is the maximum value of $\Omega$ which occurs). The resulting signals are: $V_1 = c_1 J_1(2\Phi) \sin 4\Omega t \sin\Omega_o t$ and $V_2 = c_2 J_1(2\Phi) \cos 4\Omega t \sin\Omega_o t$.

In these expressions, $c_1$ and $c_2$ are constants and $J_1$ is the Bessel function of the first order. $V_1$ and $V_2$ are amplitude-modulated signals with suppressed carrier. They can be detected in a variety of known manners. Because $\Omega_o$ is made large, the electronic circuits are comparatively simple.

In a specific example of an arrangement as shown in FIG. 1 the grating diameter was 150 mm. The period $p$ was 64 seconds of arc. At each rotation of the grating through ($p/16$) =4 sec. of arc one of the signals derived from the photocells 26 and 27 passes through zero.

Figures 3, 4A, 4B:
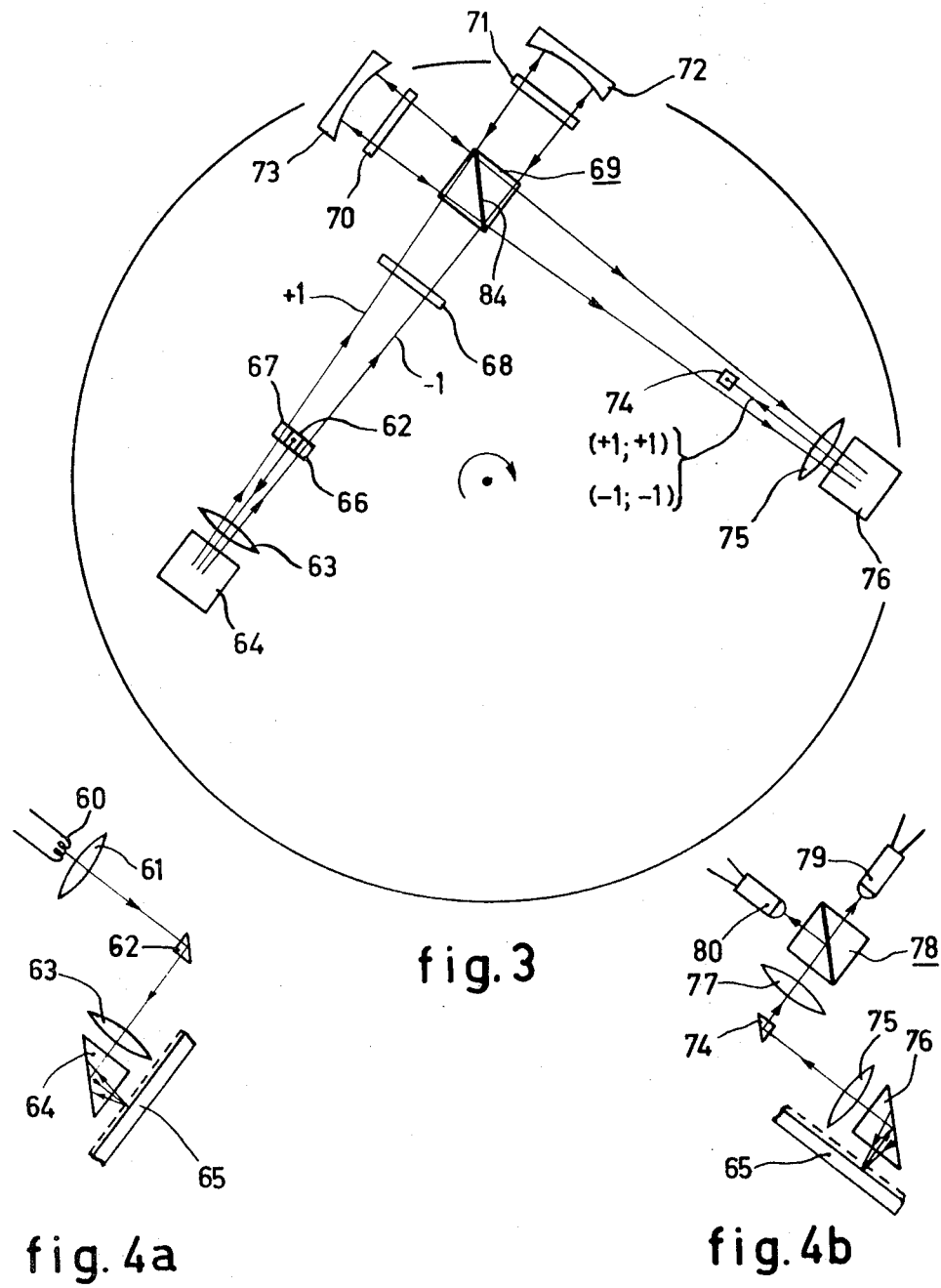
FIGS. 3, 4a and 4b illustrate a second embodiment.

The arrangement shown in FIG. 3 has much in common with that of FIG. 1 but it is of simpler structure. For the sake of clearness in FIGS. 4a and 4b ray paths have been drawn in planes normal to the plane of the drawing of FIG. 3.

Natural light from a light source 60 is imaged on the hypotenuse face of a isosceles right-angled prism 62. The beam which is totally reflected at this hypotenuse face and the path of which is parallel to the plane of a grating 65 is converted by an objective 63, which preferably is a microscope objective, to a parallel beam which is totally reflected at the hypotenuse face of a prism 64 to fall on the grating 65.

The subbeams of the orders +1 and −1 reflected at the grating are focused by the lens 63 into focal points situated on either side of the focus for the zero-order subbeam situated on the hypotenuse face of the prism 62.

In these focal points there have been arranged in a manner analogous to that used in the arrangement shown in FIG. 1 two electro-optical crystals 66, 67 the principal axes of which are at right angles to one another. The subbeams then fall on an interface 84 of a prism 69 which acts as a polarization-separating mirror. The subbeams reflected at this interface and transmitted by it traverse λ/4 plates 70 and 71, respectively, are reflected at the concave mirrors 73 and 72, respectively, and again traverse the λ/4 plates 70 and 71, respectively. Again, the direction of polarization of the subbeams returning to the prism 69 is normal to that of the subbeams which emerge from the prism towards the concave mirrors. In the prism 69 the subbeams from the direction of the concave mirrors 72 and 73 are reflected and transmitted respectively. They are converted to two collimated beams by a lens 75, for the concave mirrors 72 and 73 are disposed in the image planes of the lenses 63 and 75 respectively, and their centers of curvature lie in the focal points of the lenses 63 and 75. Thus, the concave mirrors act as field lenses. The two beams are reflected at the hypotenuse face of the prism 76 and fall on the second zone of the grating 65 situated diametrically opposite the first zone.

The coherent subbeams of the orders (+1,+1) and (−1,−1) reflected at the reflection grating, which are directionally coincident, after being totally reflected at the hypotenuse face of the prism 76, after passing through the lens 75 and after being totally reflected at the hypotenuse face of the prism 74, are directed to a polarization-separating prism 78. It will be readily apparent that the electric signals derived from photocells 79 and 80 have the same shapes as those derived from the photocells 26 and 27 in the arrangement of FIG. 1.

Directional detection is effected by inserting a thick birefringent plate 68 with inclined optic axis in the paths of the subbeams of the orders +1 and −1 towards the prism 69. The image of the subbeams for which the direction of polarization is normal to the plane of the drawing then is slightly shifted relative to that formed by the subbeams polarized in a direction parallel to the plane of the drawing.

Obviously, transmission gratings may be used instead of reflection gratings. This results in a simpler structure of the arrangements.

What is claimed is:

1. An arrangement for measuring the rotation of a second object relative to a first object, comprising a source of radiation attached to the first object, a grating attached to the second object and having lines substantially at right angles to the direction of rotation of the second object and having sufficient line density for diffraction of the radiation from the source, means for directing the radiation from the source to a first zone of the grating, whereby the so directed radiation is diffracted into subbeams of the orders +1 and −1, a polarization-separating plane mirror diagonally orientated in the path of both subbeams for reflecting and transmitting a portion of each of the subbeams into two orthogonal paths, a separate λ/4 plate mutually orthogonally located in the paths of the portions of the subbeams reflected and transmitted from the plane mirror, a separate concave mirror in the path of the radiation passing through each of the λ/4 plates for reflecting the radiation back through each of the λ/4 plates whereby the radiation reflected from the concave mirrors and passing again through the λ/4 plates are linearly polarized in mutually orthogonal planes and redirected to the plane mirror so that the portion of radiation formerly transmitted through the plane mirror is reflected therefrom as a reflected linearly polarized beam and the portion formerly reflected by the plane mirror is transmitted therethrough as a transmitted linearly polarized beam, means for directing the reflected and transmitted linearly polarized beams onto a second zone of the grating, whereby the separate beams are recombined into a beam having mutually orthogonally polarized portions, a polarization beam splitter in the path of the recombined radiation for dividing the recombined beam, and a photocell in the path of each of the divided beams from the beam splitter for detecting the intensity of each of the divided beams, whereby the rotation of said second object relative to said first object can be determined.

2. An arrangement as claimed in claim 1, wherein the means for directing the radiation onto the first and second zones of the grating each comprise a system of plane mirrors in the beams of radiation, each of the systems of mirrors comprising a first mirror inclined at an angle of approximately 45° to the plane of the grating and to the lines of the grating, and a second mirror arranged approximately 90° to the plane of the grating and in a plane intersecting the lines of the grating at acute angles, the planes of the second mirrors of each system being mutually orthogonal.

3. An arrangement as claimed in claim 1, characterized in that a planoconvex lens is arranged in the immediate proximity of each of the first and second zones, the convex surfaces of these lenses having the same or substantially the same centers of curvature as the respective concave mirrors, the radii of curvature of which are equal or substantially equal to the optical distance from the first and second zone respectively to the respective concave mirror, the said centers of curvature lying on the grating so as to be diametrical relative to the axis of rotation.

4. An arrangement as claimed in claim 1, wherein between either concave mirror and the first and second zones respectively a lens is disposed at the center of curvature of the respective concave mirror.

5. An arrangement as claimed in claim 1, wherein a central aperture is provided in the polarization-separating plane mirror.

6. An arrangement as claimed in claim 1, wherein in each of the subbeams of different orders of diffraction an electro-optical crystal is arranged, these crystals having principal directions which are at right angles to one another and having identical alternating voltages applied to them.

7. An arrangement as claimed in claim 6, wherein the alternating voltage has a high frequency and a small amplitude.

8. An arrangement as claimed in claim 1, wherein the concave mirrors are oriented so that the image of the first zone formed by one mirror on the second zone is shifted through 1/16 part of a grating period relative to the image formed by the other mirror.

9. An arrangement as claimed in claim 1, wherein there is inserted in the path of the radiation beam between the first zone and the polarization-separating plane mirror a thick birefringent plate with inclined optical axis and having a thickness and orientation such as to produce an image displacement through 1/16 part of a period for both directions of polarization.